United States Patent [19]
Amore

[11] Patent Number: 5,970,679
[45] Date of Patent: Oct. 26, 1999

[54] METAL LOADBEARING STRUCTURE HAVING STRUCTURAL CONNECTIONS WITH NO WELDING OR DRILLING

[76] Inventor: Gregorio Amore, Residence Porticatello, Via C. DA, Porticatazzo, 95040 Motta S., Anastasia, Catania, Italy

[21] Appl. No.: 08/809,175
[22] PCT Filed: Jul. 26, 1995
[86] PCT No.: PCT/IT95/00130
 § 371 Date: Jun. 2, 1997
 § 102(e) Date: Jun. 2, 1997
[87] PCT Pub. No.: WO96/06240
 PCT Pub. Date: Feb. 29, 1996

[30] Foreign Application Priority Data

Aug. 19, 1994 [IT] Italy .................................. FI94A0164

[51] Int. Cl.⁶ ...................................................... E04C 3/30
[52] U.S. Cl. .................... 52/731.7; 52/36.1; 52/127.2; 52/282.5; 52/655.1; 52/731.7; 52/736.2; 52/737.2; 403/188; 403/193; 403/195; 403/196
[58] Field of Search ................................ 52/36.1, 127.2, 52/282.5, 655.1, 731.7, 736.2, 737.2; 403/188, 193, 195, 196

[56] References Cited

U.S. PATENT DOCUMENTS

| | | | |
|---|---|---|---|
| 2,508,032 | 5/1950 | Kennedy | 52/731.7 |
| 4,261,156 | 4/1981 | Fromont et al. | 52/731.7 X |
| 5,553,347 | 9/1996 | Navon | 52/729.1 |
| 5,634,300 | 6/1997 | Huebner et al. | 52/36.1 |

FOREIGN PATENT DOCUMENTS

1503588  3/1978  United Kingdom.

*Primary Examiner*—Christopher T. Kent
*Attorney, Agent, or Firm*—McGlew and Tuttle, P.C.

[57] ABSTRACT

The structure comprises cold-formed sections built-up from elementary sections joined stably together by means of connecting braces inside the built-up section; said joined elementary sections define longitudinal slots with their longitudinal lips which are bent inwards and each inclined with respect to that opposite so as to converge towards the interior; fastening devices comprising a channel die and one or more pressure pieces are fitted along the slots in order to clamp with screw means the lips that define said slots and deform them with a locking action.

12 Claims, 11 Drawing Sheets

METAL LOADBEARING STRUCTURE HAVING STRUCTURAL CONNECTIONS WITH NO WELDING OR DRILLING

FIELD OF THE INVENTION

The invention relates to a metal structure that finds application in structural metalwork, for constructing industrial sheds with or without tramways, multi-storey buildings, aircraft hangars, loadbearing structures in general, shelving for large stores, cantilever roofs, intermediate floors, fire escape stairways, canopy roofs and anything else that can be made from cold-formed sections.

SUMMARY AND OBJECTS OF THE INVENTION

With the present invention it is possible to construct many kinds of built-up sections with different geometries but of the same kind, which permit the use of a fastening device without welding or making holes in the sections; this permits the use of thinner thicknesses than is usual in the use of conventional cold-formed sections. It is well known that in order to form a connection on a thin cold-formed section, current practice is to employ electric welding or drilling, and the surfaces involved in the connection require reinforcing with welded plates (a laborious operation whose results are always poor as far as the strength of the reinforced part is concerned) or by greatly increasing the thickness of the section to prevent it from plastically deforming when stresses are imposed. With the present invention, however, not only are the working processes greatly simplified, thus reducing production times, but also—and this is a particularly important point—the weight of the structures is reduced by some 25% compared with conventional structures, as it is possible to optimize to the maximum (for the purposes of strength) the use of special kinds of sections depending on the required loads.

The present metal loadbearing structure comprises cold-formed sections built up from elementary sections, and also fastening devices for connections or special parts of the kind already described in another earlier patent document (CT92A 000016 of 04.05.1992), and it is characterized in that a plurality of elementary sections are joined stably together by means of connecting braces inside the built-up section, said joined elementary sections defining longitudinal slots with their longitudinal lips which are bent inwards and each inclined with respect to that opposite so as to converge towards the interior; and in that fastening devices comprising a channel die and one or more pressure pieces can be fitted along the slots in order to clamp with screw means the lips that define said slots and deform them with a locking action.

In one possible embodiment, dies of at least two fastening devices are rigidly connected to each other in such a way that the two devices can be fitted at corresponding positions along slots of one built-up section.

In a possible development of the invention, two by or three or four dies can be connected stably by means of shaped plates welded to said dies; in this case the multiple fastening devices are insertable into open portions of slots at the ends of the built-up sections.

In another possible development of the invention, two opposing dies are connected by means of bars which engage with said dies, even after they have been positioned inside the built-up section. Said bars can also be used for clamping the pressure pieces.

A built-up section can be formed from two symmetrical elementary channel sections that define two opposing slots; this built-up section may be rectangular or even square in cross section. Alternatively, a built-up section can be formed from four angle sections that define four slots in opposing pairs.

Still another built-up section can be formed from one elementary channel section and two elementary angle sections, that define three slots, two of which are opposite each other; said built-up section may thus be approximately rectangular or square in cross section.

In other embodiments, a built-up section can be formed from one elementary section of essentially channel design and one other elementary angle section or equivalent, which define two slots; said built-up section being approximately triangular or trapezoidal in cross section.

However constructed, the result is a preformed built-up section to which fastening devices can be fitted in many positions, either near the ends—where the slots can be open—or in intermediate portions of the slots between fixed braces connecting the elementary sections of which the built-up section is composed.

In addition to the built-up sections and fastening devices for the connections, there will be structural connecting elements, that is special pieces or connections, which will be fitted as required and whose shapes and technical characteristics can be virtually limitless.

The elementary sections can be made in aluminium or stainless steel or carbon steel with differing mechanical strengths; the dimensions and thicknesses of the sections will depend on the particular use.

The invention will be easier to understand on perusing the description and accompanying drawing, which latter shows a practical non-restricting illustrative embodiment of the invention.

DESCRIPTION OF THE PREFERRED EMBODIMENTS

Figure 1:
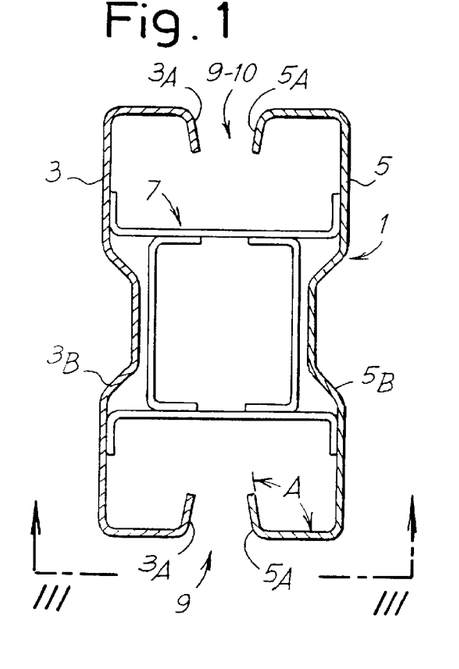
FIGS. 1 and 2 show two cross sections of a built-up section constructed according to the invention and FIG. 3 shows a view of the same from the line III—III marked in FIG. 1.
Figure 2:
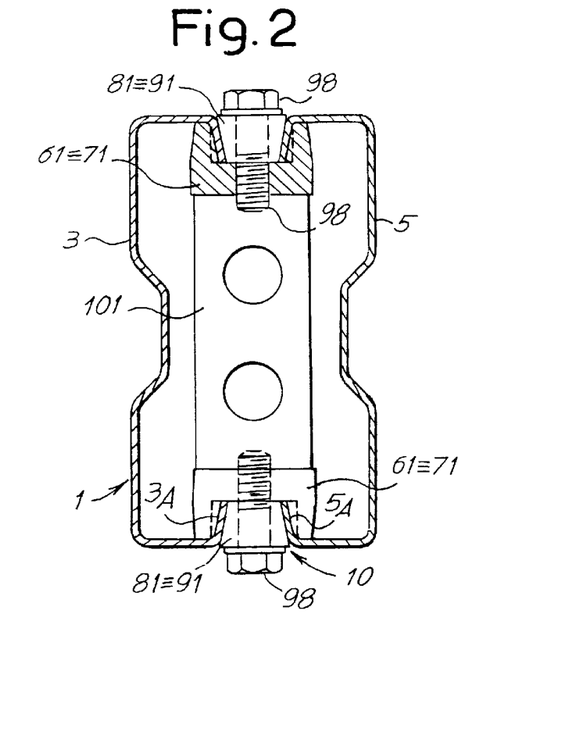
Figure 3:
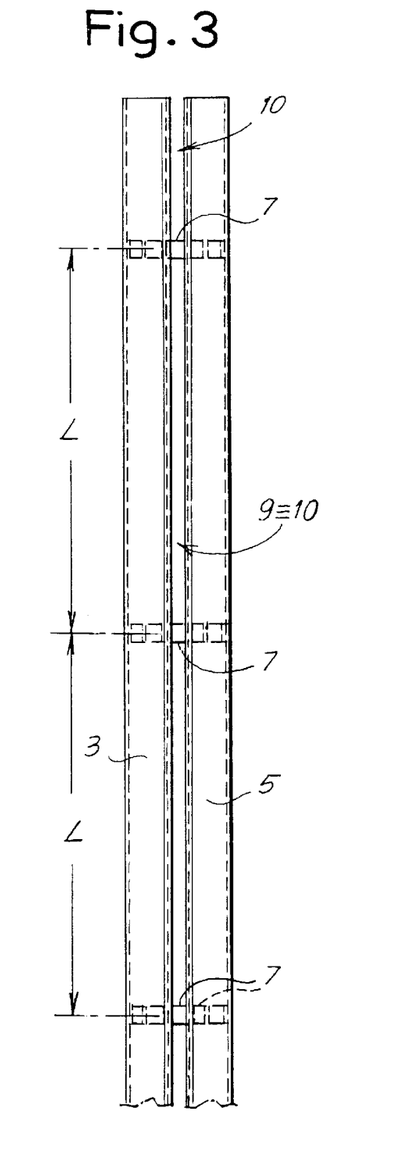

FIGS. 1 to 3 show a built-up section 1 which is made up of two elementary shallow channel sections 3, 5 defining an interior space. The channel sections have lateral lips 3A and 5A bent in to form an angle of approximately 100° and optionally reinforced lengthwise with stiffening ribs 3B and 5B. The two elementary sections 3 and 5 are made integral with each other by means of shaped braces 7 spot-welded to the inside faces of the two sections 1 and 3, a suitable distance L being left between one brace and the next; this distance, the cross section of the brace 7, and the weld spots, will be determined by requirements, by standards and by the loads which the built-up section 1 is to bear. This section thus assumes a rectangular form with two series of longitudinal slot portions 9 intermediate between neighbouring braces 7, and with slot portions 10 at the ends of the built-up section 1. The slots 9 and 10 are continuous and defined by the lips 3A, 5A, which are bent in and converge slightly towards the interior of the cross section. It is possible to insert the fastening device through the longitudinal slots 9 and 10 formed by the stable assembly of the two individual elementary sections 3 and 5.

Figure 4:
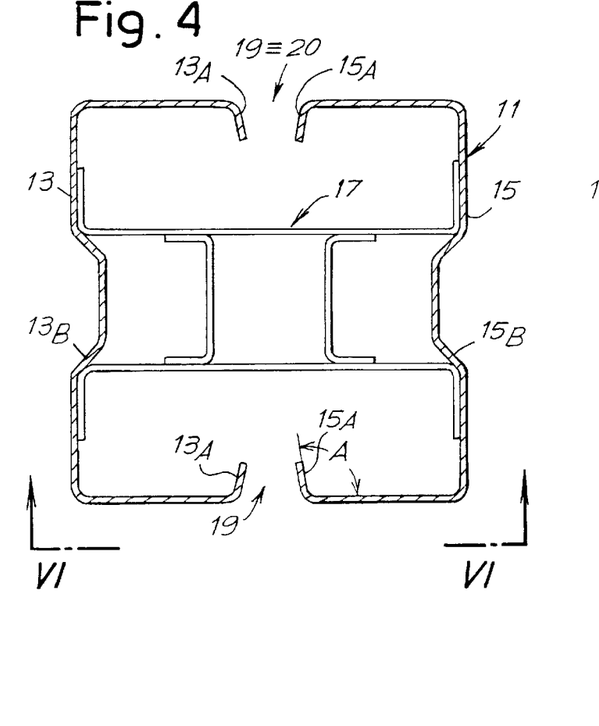
FIGS. 4, 5 and 6 show an alternative embodiment to that seen in FIGS. 1, 2 and 3.
Figure 5:
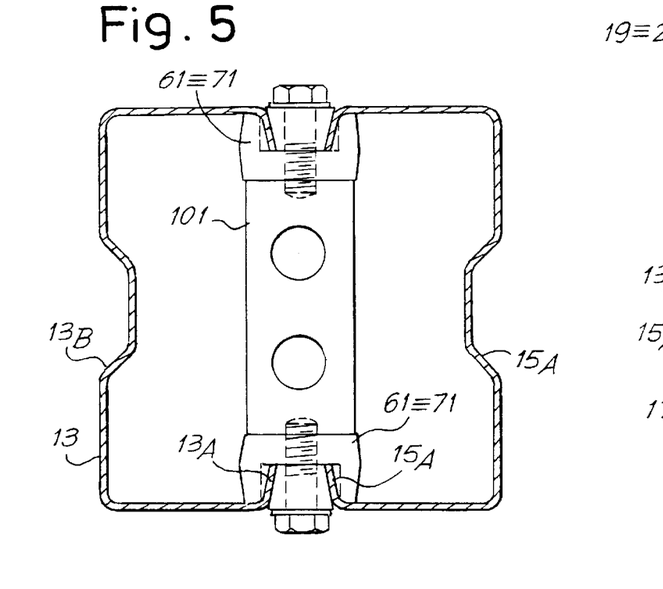
Figure 6:
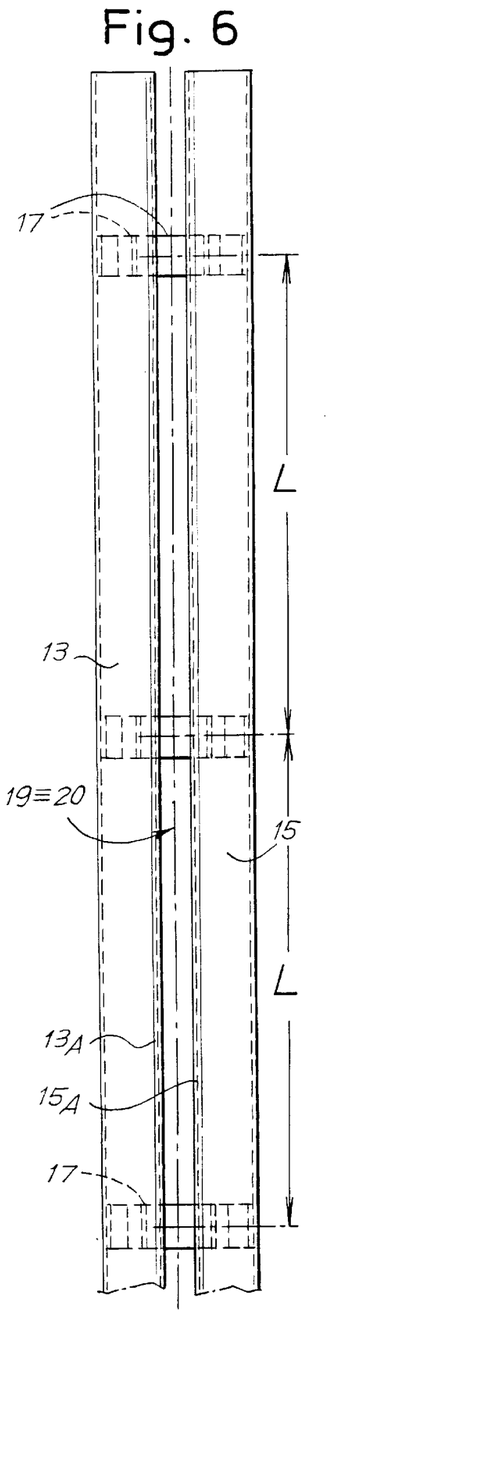

FIGS. 4 to 6 show a very similar embodiment, the same reference numerals being used but increased by "10". The only difference is in the form of the two elementary sections 13 and 15, which is such that the overall cross section (FIGS. 4 and 5) is approximately square.

Figures 7, 8, 9, 10, 11:
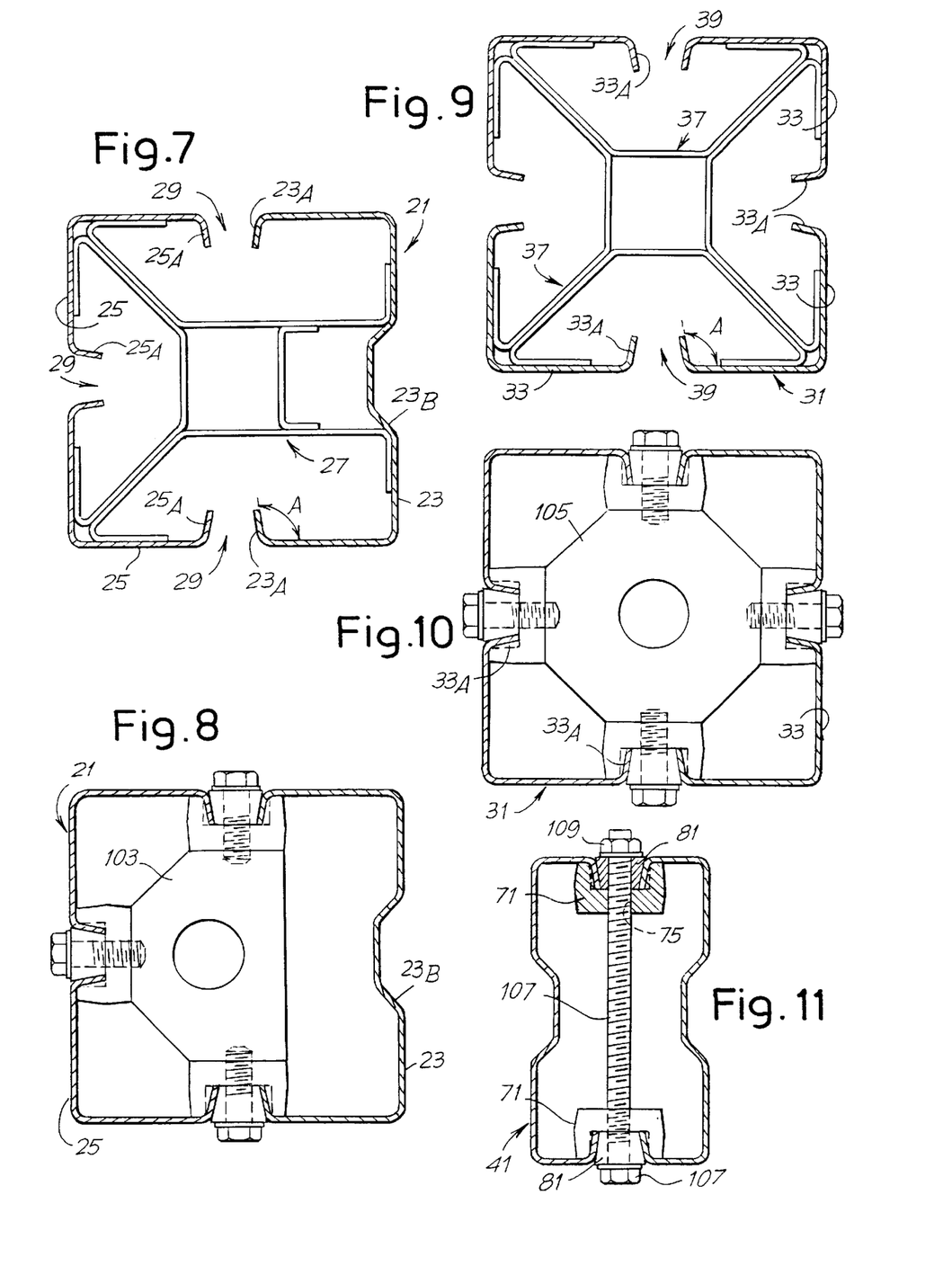
FIGS. 7 and 8 show yet another alternative embodiment to that seen in FIGS. 1 and 2.
FIGS. 9 and 10 show yet another alternative embodiment to that seen in FIGS. 1 and 2.
FIG. 11 shows a version comprising a fastening device consisting of a plurality of components that can be assembled in situ.
Figure 12:
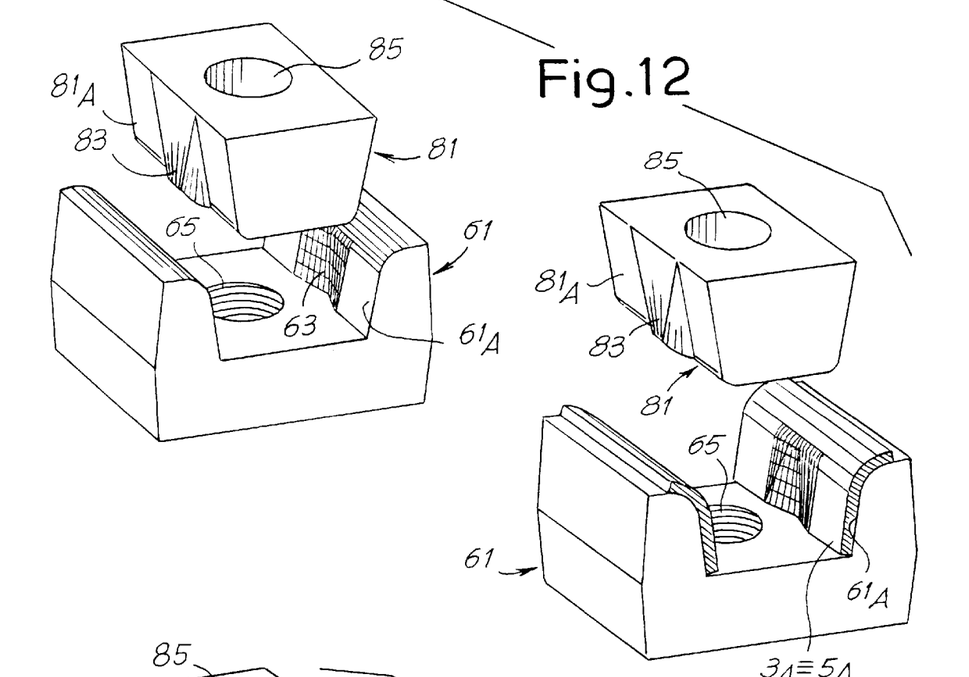
FIGS. 12 and 13 are perspective views of components of the fastening devices and how they work.
Figure 13:
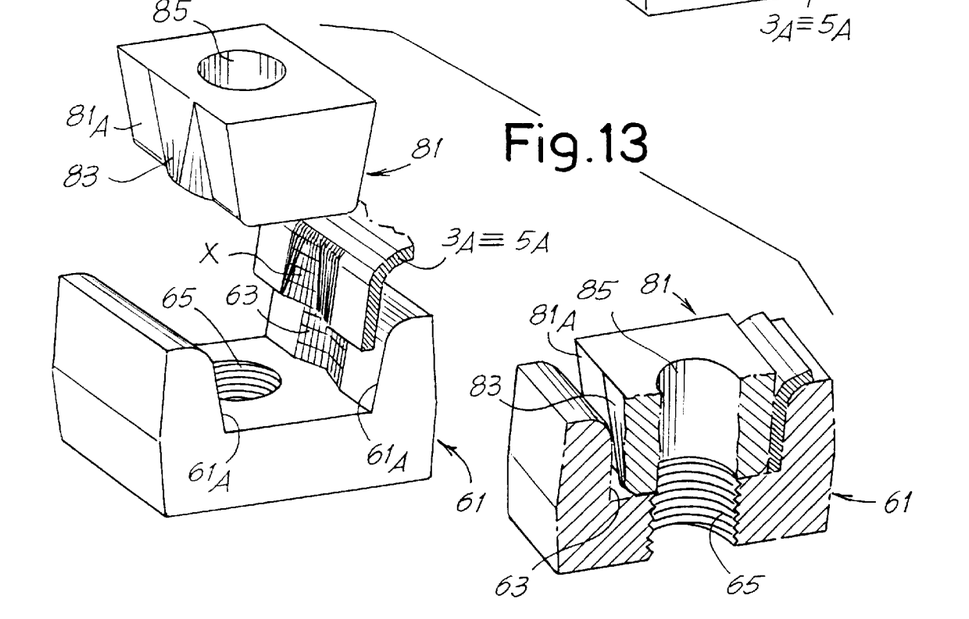
Figure 14:
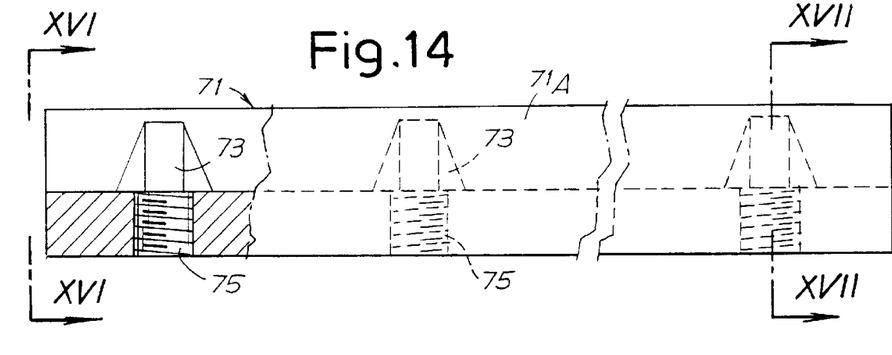
FIGS. 14, 15, 16 and 17 show a multiple die forming part of a fastening device, in two lateral geometrical views, in the view from XVI—XVI and in the section through XVII—XVII marked in FIG. 14.
Figure 15:
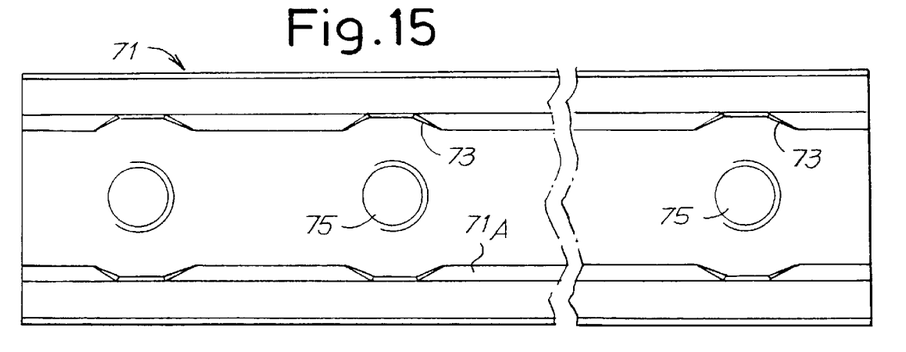
Figure 16:
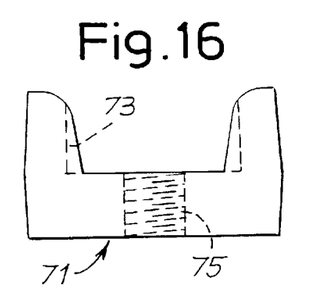
Figure 17:
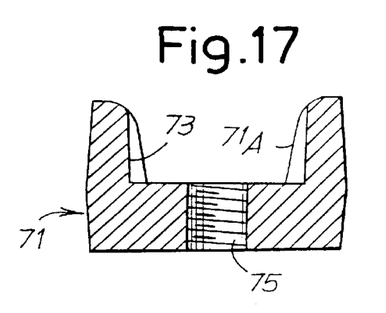
Figure 18:
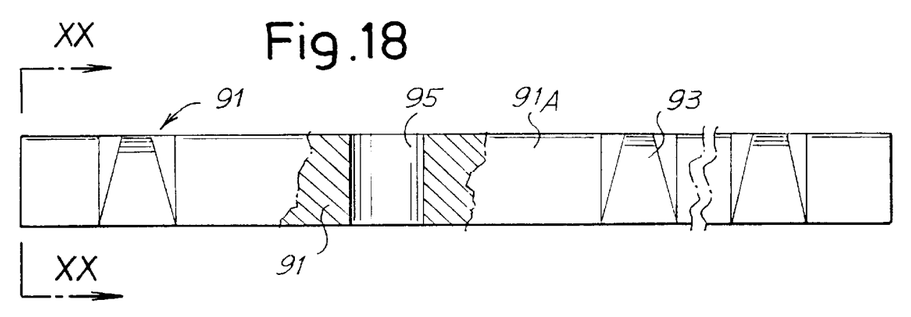
FIGS. 18, 19, 20 and 21 show a multiple pressure piece of the fastening device in two lateral views and in the view from XX—XX marked in FIG. 18 and in the section through the broken cutting plane XXI—XXI marked in FIG. 19.
Figure 19:
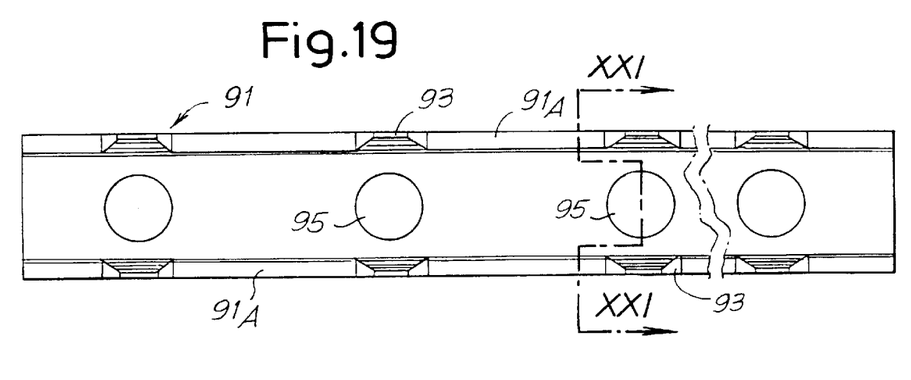
Figure 20:
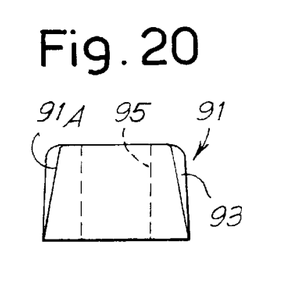
Figure 21:
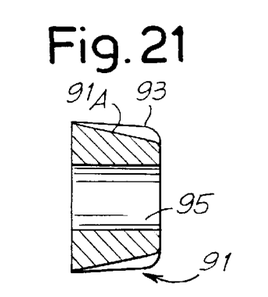

FIGS. 7 and 8 show a built-up section 21 made up of three elementary sections. One elementary section 23 is of channel form reinforced with longitudinal lips 23A and an optional stiffening rib 23B; the other two elementary sections 25 are 90 degree angle sections, likewise having lips 25A bent in to form an angle of 100 degrees. The three sections 23, 25, 25 are made stably integral with each other by means of shaped braces 27, which are spot-welded to the inside faces of the three sections. In this case three series are formed of intermediate longitudinal slots 29 and other end slots similar to 10 and 20, all continuous. The built-up section 21 is rectangular or square in shape and makes it possible to insert the fastening device into the slots of the three series of continuous longitudinal slots formed by assembling the three individual sections 23, 25, 25.

FIGS. 9 and 10 show a built-up section 31 consisting of four 90 degree angle sections 33—all identical, or only identical in pairs, so as to give square or rectangular cross sections—all with lips 33A bent in to form an angle of 100°, made integral with each other by means of shaped braces 3–7 spot-welded to the inside faces of the four sections, thus forming four series of longitudinal slots 39 intermediate between neighbouring braces and other end slots which are still longitudinally continuous.

FIG. 11 shows a built-up section 41 similar to the section 1, but with a different fastening device.

FIGS. 39 to 43 show other equivalent shapes of sections built up from two elementary sections.

The fastening devices, which will be described below, are for fitting into the slots 9, 10, 19, 20, 29, 39, and serve both to complete the connection between adjacent elementary sections and to connect external structures and special parts to the built-up section.

The fastening device is intended to be mounted anywhere along the slots on all the built-up sections and is used for assembling the special parts or connections to the built-up sections or for connecting directly (without special parts) built-up sections to single sections of normal commercial production.

Each fastening device comprises two main elements: a die, which may be single 61 or multiple 71, and a pressure piece, which may also be single 81 or multiple 91; both these elements are made of drop-forged steel and they differ in length, with one hole (single type) or two or more holes (multiple type) according to their use.

In the die, which is U-sectioned, recesses 63 and 73 are formed opposite each other on the two inside faces 61A and 71A (inclined by 10 degrees) of the forging during its drop-forging, in the constant-pitch die 71. The same process is carried out on the pressure piece 81 and 91, in which the drop-forging stage is made use of to form protuberances or keys 83 and 93 having the same constant pitch as the recesses 73 of the multiple die 71, on the two opposite sides 81A and 91A (inclined by 10 degrees) of the forging. The dies are then drilled and tapped to create holes 65 and 75 on the axis between the recesses 63 and 73 already formed during the forging stage; the pressure piece 81 and 91 is only drilled through at 85 and 95 between the protuberances or keys 83 and 93 previously formed during the forging stage. The tapped holes 65 and 75 of the die 61 and 71 and the through holes 85 and 95 of the pressure piece 81 and 91 will be of suitable dimensions for using bolts (high-strength type) which will be used as described below.

Figure 22:
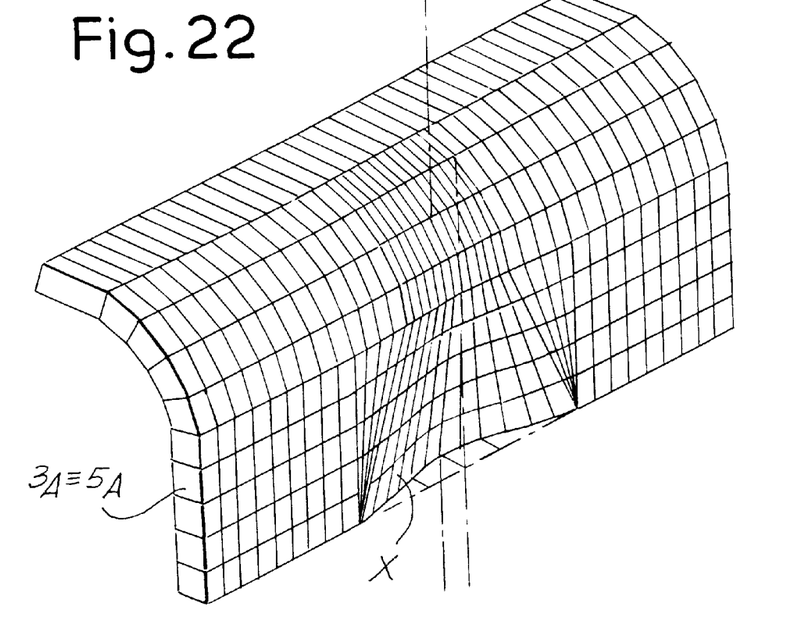
FIGS. 22 and 23 are net graphics showing the change in the shape of the inwardly-bent inclined longitudinal lips of an elementary section, with the deformations imposed by the clamping device.
Figure 23:
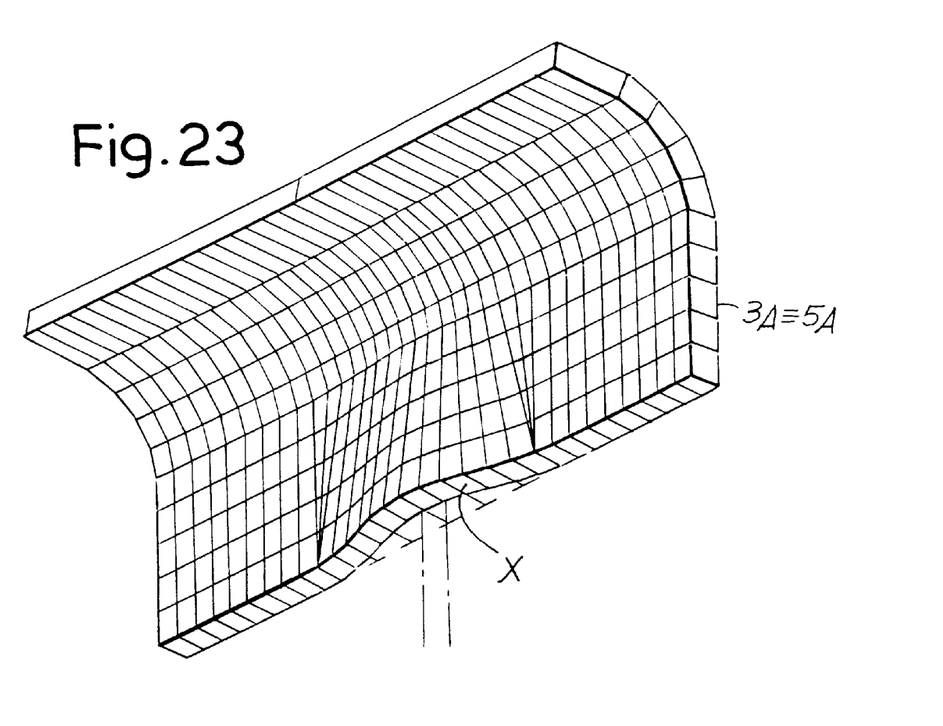
Figures 24, 25, 26, 27, 28, 29:
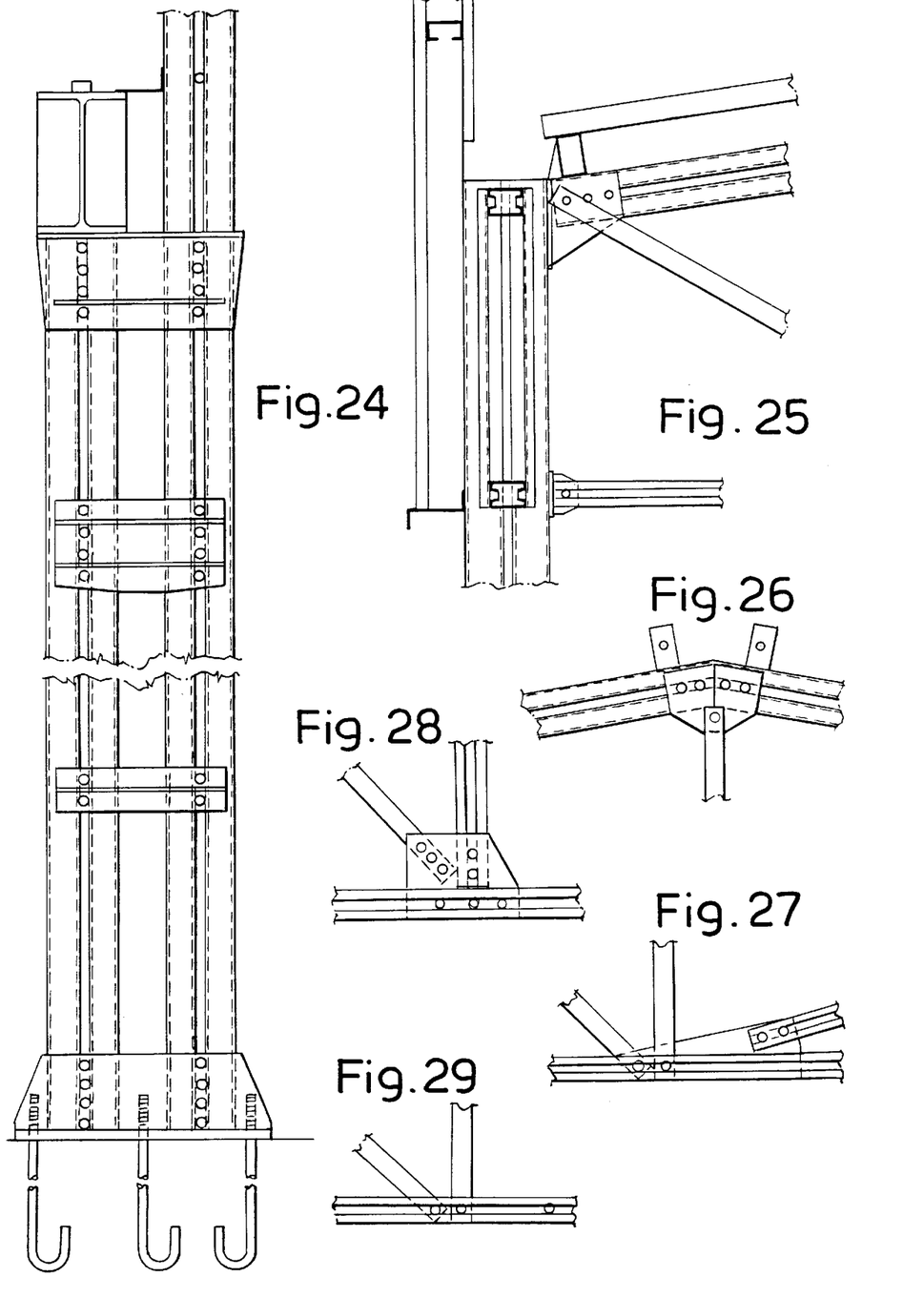
FIG. 24 shows a column constructed with a built-up section according to the invention.
FIGS. 25 to 32 show connections and structures that can be constructed with the built-up sections according to the invention.
Figures 30, 31, 33, 34:
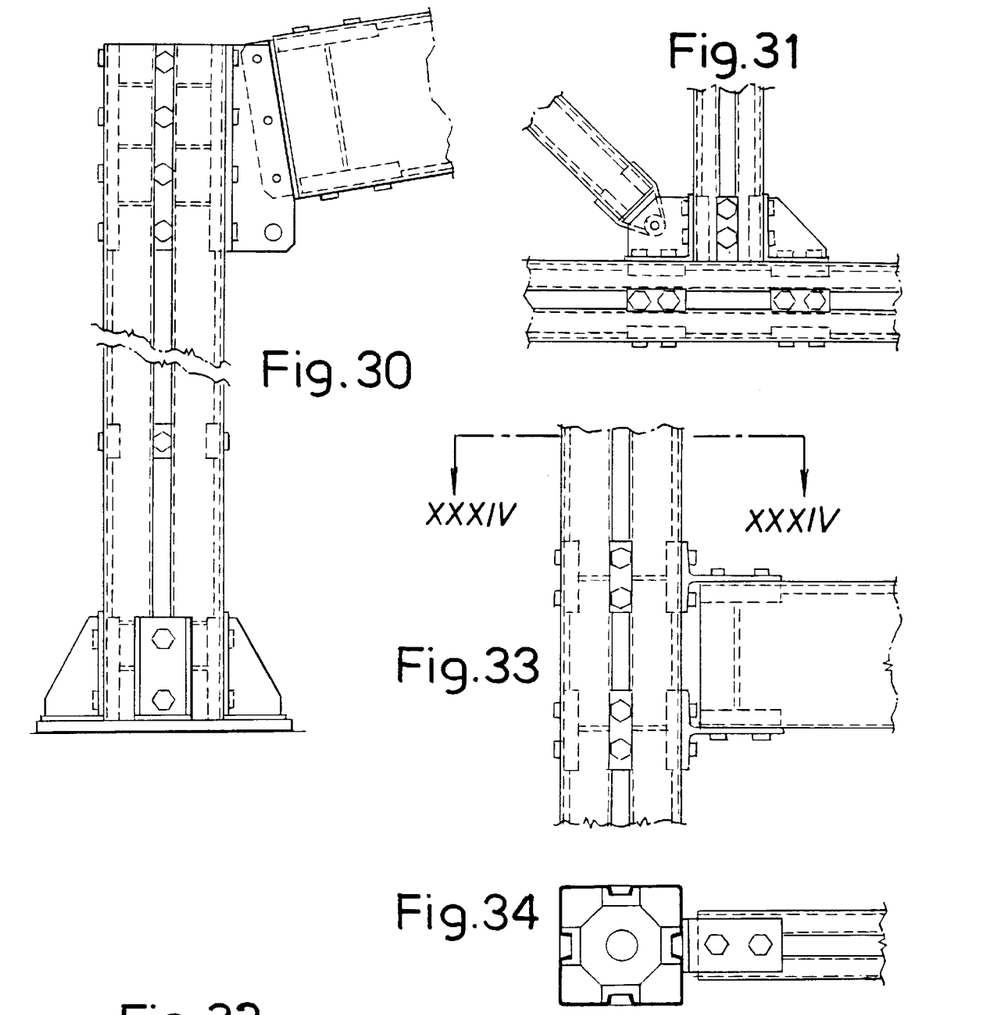
FIGS. 33 and 34; 35 and 36; 37 and 38 show lateral views and views through XXXIV—XXXIV, XXXVI—XXXVI and XXXVIII—XXXVIII of other forms of connections and structures that can be constructed according to the invention.
Figure 32:
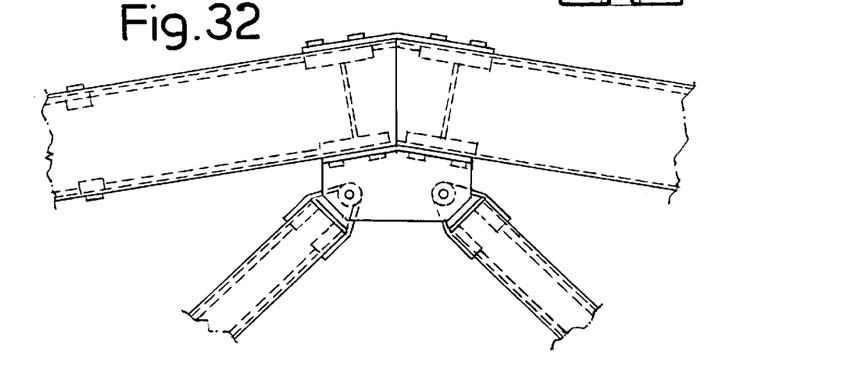
Figure 35:
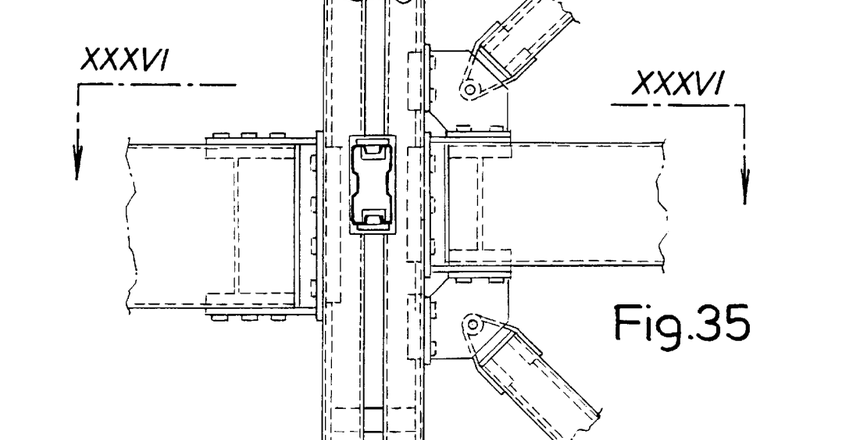
Figures 36, 37:
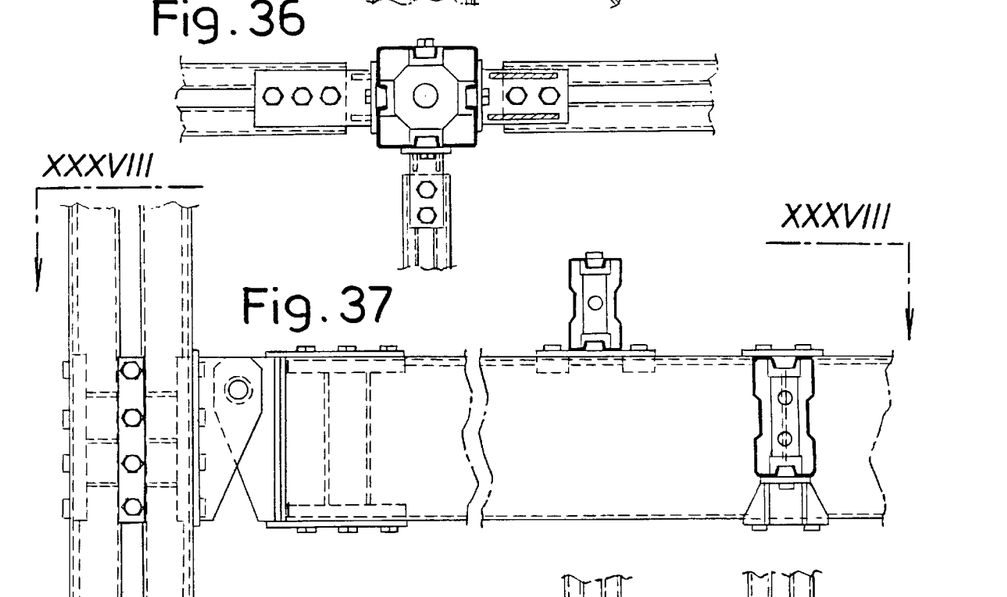
Figure 38:
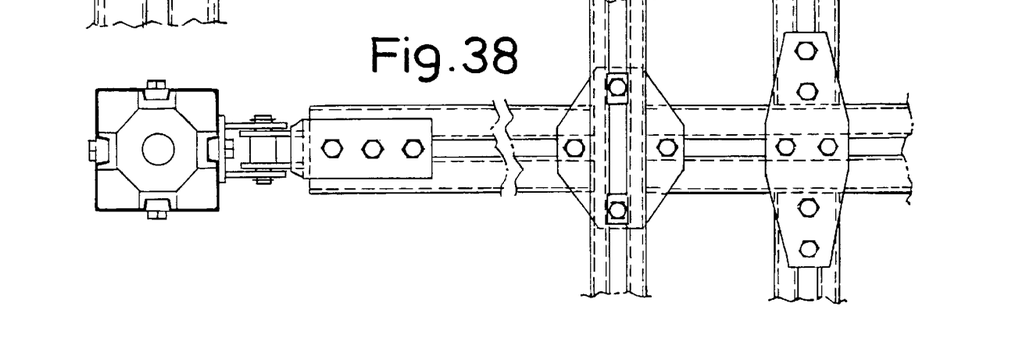
Figures 39, 40:
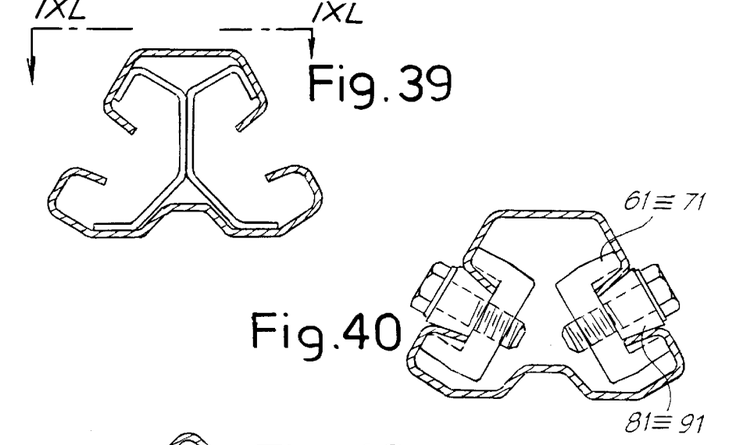
FIGS. 39, 40 and 41 show, in the same way as in FIGS. 1, 2 and 3, other alternative embodiments of a built-up section.
Figure 41:
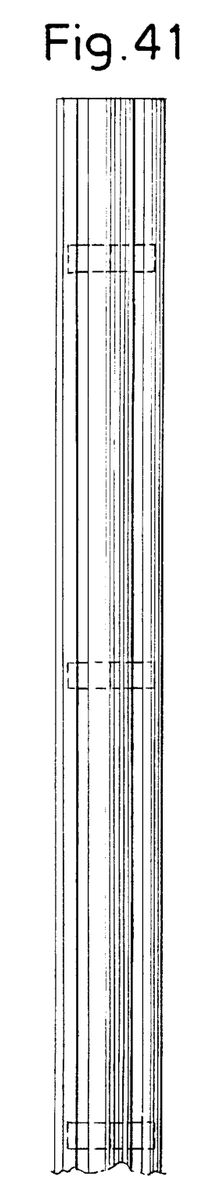

The purpose of the fastening device formed by the die and pressure piece or pieces is to provide at any point along the built-up sections such as 1, 11, 21, 31, 41 in the lips 3A, 5A; 13A, 15A; 23A, 25A; 33A, 35A along the slots 9, 10; 19, 20; 29, 30; 39 etc. a strong, stable locking action without resorting to drilling or welding. To this end the die element 61 or 71 of the device is inserted through the slot 9 or 10 or the like until it is inside the built-up section and said die element is positioned with its two inside faces 61A or 71A against the abovementioned lips of the built-up section; at the same time the pressure piece 81 or 91 is introduced externally into the slot portion —where the die is located— and fastened to the die 61 or 71 with a bolt 98 (see in particular FIG. 2) which is screwed into the tapped hole 65 or 75; under the clamping action of the bolt 98, the pressure piece wedges itself between the lips of the section by means of its protuberances or keys 83 or 93 which lie in the same axis as the recesses 63 or 73 of the die. Thus the die and pressure piece together produce a plastic deformation by way of a key in the lips defining the slot 9 or 10 or 19 or 20 etc. of the built-up section into which the clamping device is forced (see deformations X in FIGS. 22 and 23). When these deformations have been formed, it is a simple matter to unscrew the bolt or bolts 98, leaving the fastening device ready to take any special part or individual section of normal commercial production. The same bolt 98 as was used to create the joint, or another longer equivalent bolt, is then reinserted to lock the special or single part to the built-up section 10 or 11 or 21 or 31 at any point along each of the slots formed in the built-up section, the tightening force being controlled by a torque wrench.

Destructive tests in tension have demonstrated that the joints between the built-up section and the die/pressure piece are of two kinds: the first is due to the keys and recesses and to the deformations of the lips; the second is caused by the friction between the contact faces of the fastening device die/lips of the section/pressure piece, and both are produced by the clamping action of the bolt 98 or equivalent. The strength of the joint is obviously proportional to the number of devices and to the length of each device in the direction of the slot; by stressing the system until failure (taking into account the thickness and quality of the material of the elementary sections and in proportion to the number of joints) it has been shown that around the fastening device, the section is the first to yield.

In some cases, at the most stressed connections, the fastening devices can be joined to each other, inside the various built-up sections—these devices will generally correspond to each other in the various slots.

It can be seen in FIGS. 2 and 5 that the two dies 61 or 71 are connected by means of a plate 101 or a plurality of plates 101 welded to said dies. In FIGS. 8 or 10, plates 103 or 105 are welded to three or four dies of the fastening device. In these embodiments, the fastening devices (generally consisting of multiple dies and pressure pieces) can only be inserted into the ends of the slots such as 10 (FIG. 3) or 20 (FIG. 5) or the like of built-up sections.

In the alternative embodiment shown in FIG. 11, two opposing dies 61 or 71 can be connected together—after insertion through the slots 9 or 10 (or equivalent) of a built-up section—by means of threaded bars 107 which screw into the lined-up tapped holes (75 or 65) of the two dies. Using the head 107A with which one end of each bar 107 is provided, and using a nut 109 that screws onto the other end—which is always threaded—of the same bar, pressure pieces 81 or 91 are clamped into slots whose lips have been previously deformed. In this case, opposing fastening devices can also be fitted in portions of slots—such as 9—lying between fixed braces 7 or equivalent means.

Connections, special parts or other components of a structure that includes built-up sections such as 1 to 41 or equivalent can be locked onto the fastening devices as described. These components have an important function in constructing any kind of load-bearing structural complex, such as those illustrated in FIGS. 24 to 38 to provide an idea of the possibilities, utility and advantages of the proposed system. Special parts or connections will be constructed according to the needs of the project; these components can therefore be constructed with virtually limitless shapes and technical characteristics, as the aforementioned figures indicate by way of example.

The main object of the present structural system is to simplify and speed up the construction of metal structures in general; this has been possible by optimizing to the maximum (for the purposes of strengths) the use of the cold-formed sections built up as the stresses will require. The total weight of the finished structure is around 25% less than that of conventional structures. The weight reduction—proved by scientific and computing means and backed up by destructive laboratory tests—has advantageous effects on the weights and general costs of the various applications envisaged. Lower costs of the structures, lower costs of the associated works (foundations), and lower transport costs also result. All this is reflected positively too, in a substantial general saving of energy. Another object, and likewise of great importance, is to reduce manufacturing costs, which are greatly reduced inasmuch as there is no drilling or welding of the built-up cold-formed sections. Since the special parts will always be of small dimensions, they can be made on automated cycles and welded by robots.

Figures 42, 43, 44:
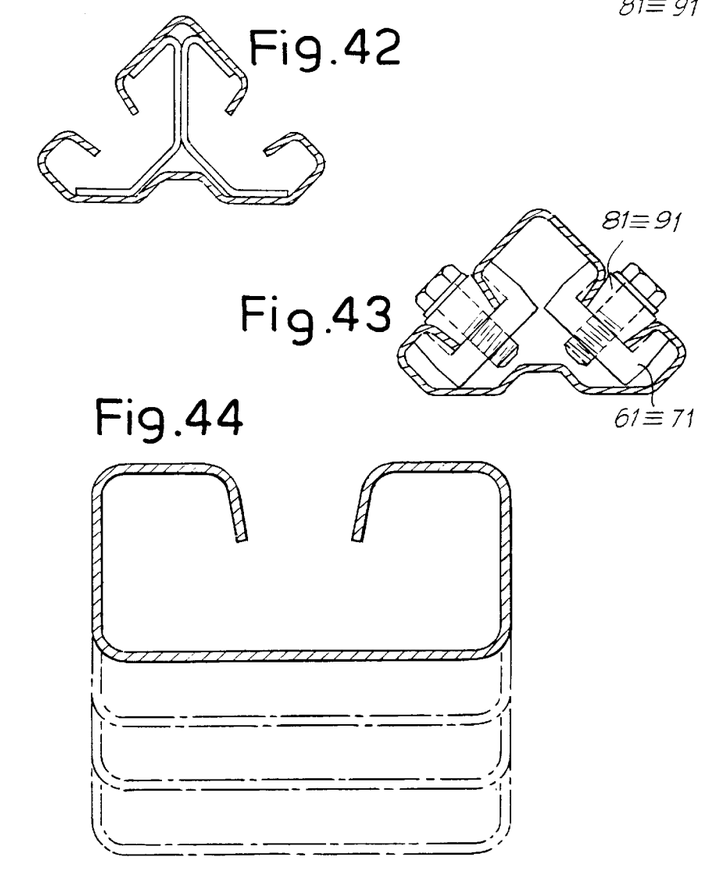
FIGS. 42 and 43 show an alternative embodiment to that seen in FIGS. 39 and 40.
FIG. 44 shows a single elementary section.

FIG. 44 shows another elementary section that can be combined with those described above.

It will be understood that the drawing shows only an illustrative embodiment purely by way of a practical demonstration of the invention, as the latter can be varied in shapes and arrangements without thereby departing from the scope of the -concept underlying the invention. The purpose of any reference numerals in the accompanying claims is to facilitate the reading of the claims with reference to the description and to the drawing, and does not limit the scope of protection represented by the claims.

What is claimed is:

1. A load bearing structure comprising:
   a first section with a plurality of lips;
   a second section with a plurality of lips, said second section being spaced from said first section to define an interior space, said lips of said first and second sections extending into said interior space and being inclined toward each other, said lips defining a plurality of slots with each said slot including one lip from each of said sections;
   a brace connecting said first and second sections together;
   a die having a channel shape and positionable in said interior space to receive said lips in an inside of said channel shape;
   a pressure piece positionable in said slots and between said lips;
   a screw clamping and deforming said lips between said pressure piece and said die to lock said pressure piece and said die to said lips.

2. The structure in accordance with claim 1, wherein:
   said first and second sections each define a concavity, said lips are arranged at edges of said concavity, said first and second sections being positioned to have an open end of said concavities face each other;
   said one lip of said first section and said one lip of said second section being positioned on opposite sides of a respective said slot.

3. The structure in accordance with claim 1, wherein:
   each of said first and second sections are channel shaped with a first leg, a second leg and a concavity, an end of each said first and second legs includes one of said lips, said first and second sections being positioned to define a pair of said slots with each of said pair of slots being formed with one of said lips from each of said first and second sections.

4. The structure in accordance with claim 1, wherein:
   each of said first and second sections include a plurality of opposing said lips, said first and second sections are channel shaped, concavities of said channel shape of said first and second sections face each other to define a pair of opposing said slots with lateral walls being formed by said channel shaped sections, said lateral walls of each said slot being formed by two lateral lips belonging to said two channel shaped sections.

5. The structure in accordance with claim 1, wherein:
   third and fourth sections are provided, said first, second, third and fourth sections are angled and positioned to define four said slots in opposing pairs.

6. The structure in accordance with claim 1, wherein:

a third section is channel shaped, said first and second sections are angle sections, said first, second, and third sections are positioned to define three said slots and have a rectangular cross section, two of said three slots are opposite each other.

7. The structure in accordance with claim 1, wherein:

said first section is a channel shape, and said second section is an angle shape, said first and second sections are positioned to define two said slots and have one of a substantially triangular and substantially trapezoidal cross section.

8. A metal load bearing structure comprising:

a first elementary section with a plurality of lips a second elementary section with a plurality of lips, said second section being spaced from said first section and defining an interior space, said lips of said first and second sections extending into said interior space and defining a continuous longitudinal slot, said lips being inclined with respect to each other to converge toward said interior space;

a plurality of braces connecting said first and second sections together;

a plurality of fastening devices including a channel die and a pressure piece fitted in said slots, said fastening devices including screw means for clamping and deforming said lips between said pressure piece and said die to lock said pressure piece and said die to said lips, said plurality of dies being connected to each other.

9. The structure in accordance with claim 8, further comprising:

a plate welded to said plurality of dies;

said plurality of fastening devices being insertable into ends of said positioned first and second sections.

10. The structure in accordance with claim 8, wherein:

a plurality of said dies are connected by a bar engaged with said plurality of dies.

11. The structure in accordance with claim 8, wherein:

each of said plurality of dies defines a threaded hole;

said bar engages said threaded hole in said plurality of dies.

12. The structure in accordance with claim 8, wherein:

a plurality of said dies are connected by a plurality of plates engaging with said plurality of dies.

* * * * *